United States Patent
Yeh et al.

(10) Patent No.: US 9,785,285 B2
(45) Date of Patent: Oct. 10, 2017

(54) DETECTION METHOD AND DEVICE FOR TOUCH PANEL

(71) Applicant: CHENG MEI INSTRUMENT TECHNOLOGY CO., LTD., Zhubei (TW)

(72) Inventors: Chao-Yi Yeh, Zhubei (TW); Hung Chun Lo, Zhubei (TW); Shang-Iun Yang, Zhubei (TW); Chi-Yuan Lin, Zhubei (TW)

(73) Assignee: CHENG MEI INSTRUMENT TECHNOLOGY CO., LTD., Zhubei (TW)

(*) Notice: Subject to any disclaimer, the term of this patent is extended or adjusted under 35 U.S.C. 154(b) by 43 days.

(21) Appl. No.: 14/995,886

(22) Filed: Jan. 14, 2016

(65) Prior Publication Data
US 2016/0225139 A1 Aug. 4, 2016

Related U.S. Application Data

(60) Provisional application No. 62/109,399, filed on Jan. 29, 2015.

(51) Int. Cl.
*G06K 9/00* (2006.01)
*G06F 3/041* (2006.01)

(52) U.S. Cl.
CPC .......... *G06F 3/0418* (2013.01); *G06F 3/0412* (2013.01); *G06F 2203/04103* (2013.01)

(58) Field of Classification Search
CPC ..... G06T 7/001; G06T 7/0004; G06T 7/0008; G06T 7/60; G06T 2207/30108; G06T 2207/30148; G06T 2207/30164; H04N 5/225; G01N 21/88; G06F 3/0418
See application file for complete search history.

(56) References Cited

U.S. PATENT DOCUMENTS

| | | | |
|---|---|---|---|
| 5,717,780 A | 2/1998 | Mitsumune et al. | |
| 6,477,332 B1* | 11/2002 | Ohsawa | H04N 5/225 348/333.01 |
| 2005/0179816 A1* | 8/2005 | Matsumura | H04N 5/4403 348/554 |
| 2006/0233434 A1 | 10/2006 | Hamamatsu et al. | |
| 2010/0039402 A1* | 2/2010 | Okazaki | G06F 1/3231 345/173 |
| 2010/0302177 A1* | 12/2010 | Kim | G06F 3/04883 345/173 |

(Continued)

FOREIGN PATENT DOCUMENTS

| TW | 200844429 A | 11/2008 |
|---|---|---|
| TW | 201132957 A | 10/2011 |

(Continued)

*Primary Examiner* — Amir Alavi
(74) *Attorney, Agent, or Firm* — Christensen, Fonder, Dardi & Herbert PLLC (57) ABSTRACT

A detection method for a touch panel is provided. The method includes the following steps: (a) using a transfer device to move the touch panel; (b) placing the touch panel on an LCD monitor; (c) emitting at least one striped light pattern from the LCD monitor; (d) using at least one camera to capture an image that is formed by the at least one striped light pattern through the touch panel; and (e) using a processor to analyze the image to complete the detection of the touch panel.

12 Claims, 6 Drawing Sheets

(56) References Cited

U.S. PATENT DOCUMENTS

| | | | | |
|---|---|---|---|---|
| 2011/0164063 A1* | 7/2011 | Shimotani | ............ | G06F 3/0416 345/661 |
| 2011/0210928 A1* | 9/2011 | Matsuda | ............ | G06F 3/04886 345/173 |
| 2011/0222725 A1* | 9/2011 | Mitsushio | ............ | G06T 7/0004 382/103 |
| 2011/0298732 A1* | 12/2011 | Yoshimoto | ............ | G06F 3/041 345/173 |
| 2016/0225139 A1* | 8/2016 | Yeh | ............ | G06F 3/0412 |

FOREIGN PATENT DOCUMENTS

| | | |
|---|---|---|
| TW | M441822 U1 | 11/2012 |
| TW | M457889 U1 | 7/2013 |
| TW | M470256 U | 1/2014 |

* cited by examiner

DETECTION METHOD AND DEVICE FOR TOUCH PANEL

This application claims the benefit of U.S. Provisional Application No. 62/109,399 filed on Jan. 29, 2015.

CROSS-REFERENCES TO RELATED APPLICATIONS

Not applicable.

BACKGROUND OF THE INVENTION

Field of the Invention

The present invention relates to a detection method and a detection device for a touch panel, in particular, it relates to a method and a device that detects a touch panel using at least one striped light pattern.

Descriptions of the Related Art

In the prior art, detection of touch panels, especially of touch panels with curved edge areas is performed through visual inspection by observing and inspecting the touch panels from various angles under orange light.

Although the aforesaid panel detection performed through visual inspection is precise, more detecting personnel are required if all of the produced touch panels need to be comprehensively detected. As a result, this increases relevant labor costs.

In addition, in the panel detection performed through visual inspection, the accuracy of the detection result will inevitably be affected by the physical fitness, the emotion or the like of the detecting personnel. Moreover, the efficiency of the manual detection can lead to a bottleneck when volume increases, and when the number of the panels to be detected has reached an upper limit, it is necessary to increase the number of detecting personnel to alleviate the bottleneck.

Accordingly, it is important to provide a method and a device that can rapidly detect a touch panel instead of relying on visual inspection.

SUMMARY OF THE INVENTION

An objective of the present invention is to provide a method and a device that can be used to detect defects of a touch panel, thereby achieving the objective of rapidly detecting the touch panel.

Another objective of the present invention is to provide a detection method, which can detect "opening defect", "edge area defect", "opening barrier defect", and "defect at an interface between a central area and the edge area" or the like for a touch panel with at least one opening and curved edge areas, thereby, rapidly completing the relevant detection.

To achieve the aforesaid objectives, a detection device of the present invention comprises an LCD monitor, a transfer device, at least one camera and a processor. The LCD monitor is adapted to emit at least one striped light pattern. The transfer device is adapted to grab the touch panel and place the touch panel on the LCD monitor. At least one camera is disposed above the LCD monitor. The processor is electrically connected with the at least one camera. The at least one camera is adapted to capture an image formed by the at least one striped light pattern through the touch panel, and the processor analyzes the image to complete the detection of the touch panel.

To achieve the aforesaid objectives, the at least one striped light pattern emitted by the detection device of the present invention has a plurality of parallel stripes for detecting two short sides of the touch panel.

To achieve the aforesaid objectives, the at least one striped light pattern emitted by the detection device of the present invention has a plurality of parallel stripes for detecting two long sides of the touch panel.

To achieve the aforesaid objectives, the touch panel detected by the detection device of the present invention is an injection molded touch panel.

To achieve the aforesaid objectives, a detection method for a touch panel of the present invention comprises the following steps of: (a) using a transfer device to move the touch panel; (b) placing the touch panel on an LCD monitor; (c) emitting at least one striped light pattern from the LCD monitor; using at least one camera to capture an image formed by the at least one striped light pattern through the touch panel; and using a processor to analyze the image to complete the detection of the touch panel.

To achieve the aforesaid objectives, the touch panel comprised in the detection method of the present invention has a front surface and a rear surface disposed opposite to the front surface, the front surface comprises a central area and four edge areas disposed around the central area, the four edge areas are curved edge areas and the central area has at least one opening formed therein.

To achieve the aforesaid objectives, if a part of the at least one opening comprised in the detection method of the present invention is formed in at least one of the four edge areas, a first refracted image is formed by the at least one striped light pattern passing through the part of the at least one opening so that the touch panel is determined by the processor to be defective.

To achieve the aforesaid objectives, if there is a horizontal line in the four edge areas comprised in the detection method of the present invention, a second refracted image is formed by the at least one striped light pattern passing through the horizontal line so that the touch panel is determined by the processor to be defective.

To achieve the aforesaid objectives, if the at least one opening comprised in the detection method of the present invention has an opening barrier defect, a third refracted image is formed by the at least one striped light pattern passing through the opening barrier defect so that the touch panel is determined by the processor to be defective.

To achieve the aforesaid objectives, if there is a defect at an interface between the central area and the four edge areas comprised in the detection method of the present invention, a fourth refracted image is formed by the at least one striped light pattern passing through the defect so that the touch panel is determined by the processor to be defective.

To achieve the aforesaid objectives, the at least one striped light pattern comprised in the detection method of the present invention has a plurality of parallel stripes for detecting two short sides of the touch panel.

To achieve the aforesaid objectives, the at least one striped light pattern comprised in the detection method of the present invention has a plurality of parallel stripes for detecting two long sides of the touch panel.

To achieve the aforesaid objectives, the touch panel detected through the detection method of the present invention is an injection molded touch panel.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

The present invention relates to a device and a method for detecting a touch panel 200 with curved edge areas.

For ease of understanding, the technical features of elements comprised in a detection device of the present invention are first described hereinafter.

Figure 1:
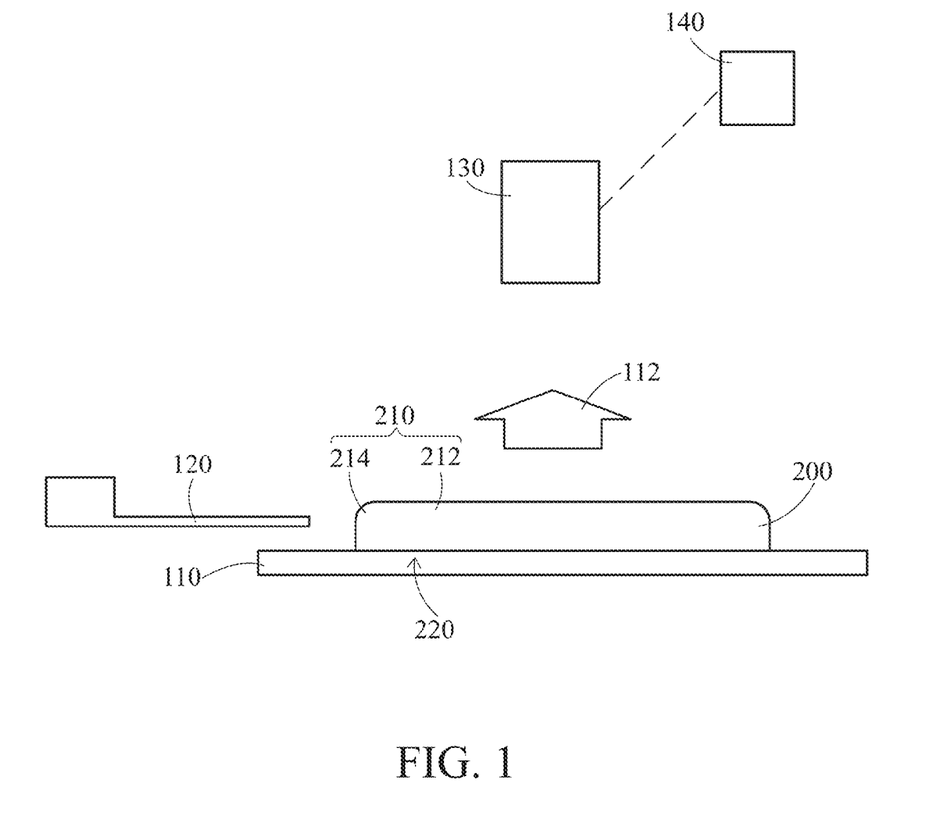
FIG. 1 is a schematic view illustrating the detection performed by the detection device of the present invention.

First, as shown in FIG. 1, a detection device 100 of the present invention comprises an LCD monitor 110, a transfer device 120, a camera 130 and a processor 140.

The LCD monitor 110 is adapted to emit and display at least one striped light pattern 112. The transfer device 120 is adapted to grab a touch panel 200 to be detected and place the touch panel 200 on the LCD monitor 110. The camera 130 is disposed above the LCD monitor 110. The processor 140 is electrically connected with the camera 130.

Accordingly, with the aforesaid configuration, the camera 130 disposed above the LCD monitor 110 may thus capture an image formed by the at least one striped light pattern 112 that is displayed from the LCD monitor 110 and then passes it through the touch panel 200. The processor 140 analyzes the image to complete the detection of the touch panel 200 based on the analysis result.

In detail, in the aforesaid configuration, the LCD monitor 110 preferably has an area larger than that of the touch panel 200 to ensure that the striped light pattern 112 emitted from the LCD monitor 110 can pass through the periphery of the touch panel 200 to be detected.

Additionally, in the aspect shown in FIG. 1, although the camera 130 is disposed right above the touch panel 200 and the LCD monitor 110, the present invention is not limited thereto. In other words, the camera 130 may also be disposed obliquely above the touch panel 200 and the LCD monitor 110 to obtain the image formed by the striped light pattern 112 passing through the touch panel 200 from bottom to top.

Figure 2:
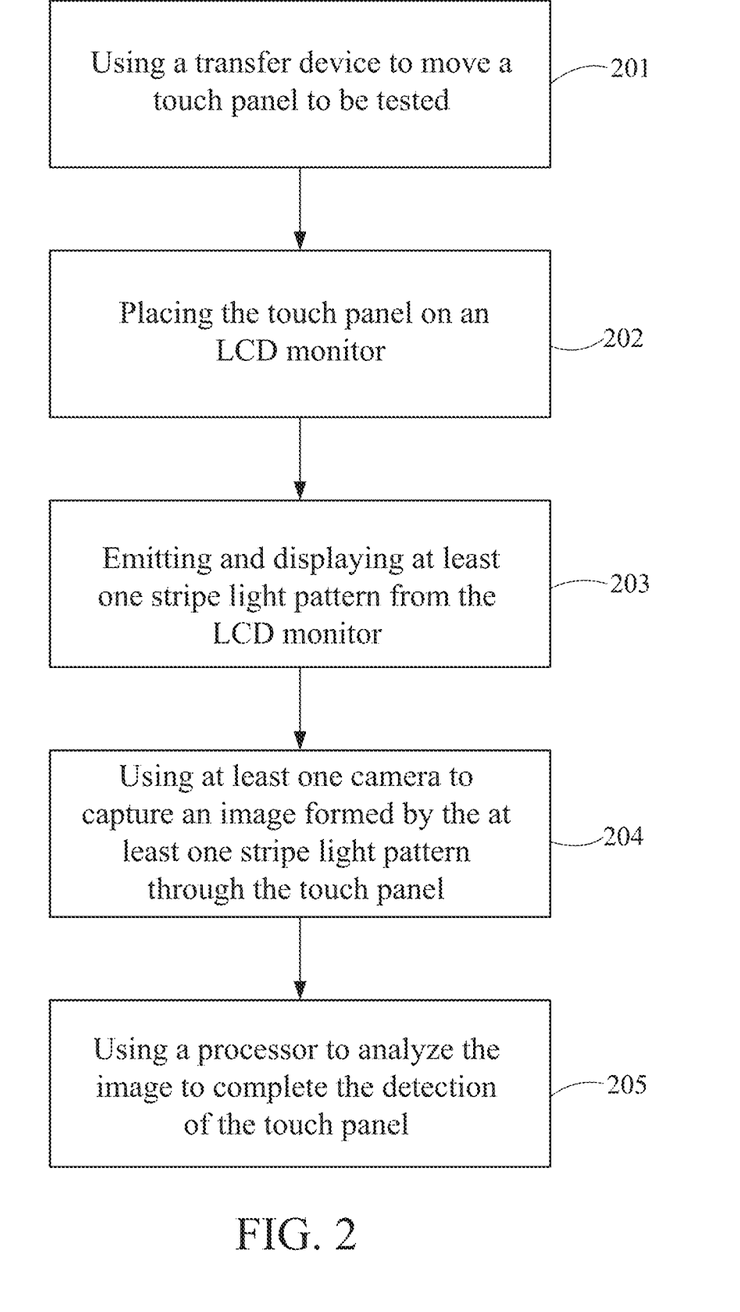
FIG. 2 is a flowchart diagram of a detection method of the present invention.

As shown in FIG. 2, the present invention also discloses a detection method for a touch panel, which comprises the following steps of: first using a transfer device 120 to move a touch panel 200 to be tested, as shown in step 201; placing the touch panel 200 on an LCD monitor 110, as shown in step 202; emitting and displaying at least one striped light pattern 112 from the LCD monitor 110, as shown in step 203; using at least one camera 130 to capture an image formed by the at least one striped light pattern 112 through the touch panel 110, as shown in step 204; and finally using a processor 140 to analyze the image to complete the detection of the touch panel 200, as shown in step 205.

Thus, by emitting and displaying at least one striped light pattern 112 from the LCD monitor 110, the "opening defect", "edge area defect", "opening barrier defect", and "defect at the interface between the central area and the edge area" or the like may be detected for the touch panel 200 disposed on the LCD monitor 110.

Hereinafter, contents of the "opening defect", "edge area defect", "opening barrier defect", and "defect at the interface between the central area and the edge area" will be described respectively.

Figure 3A:
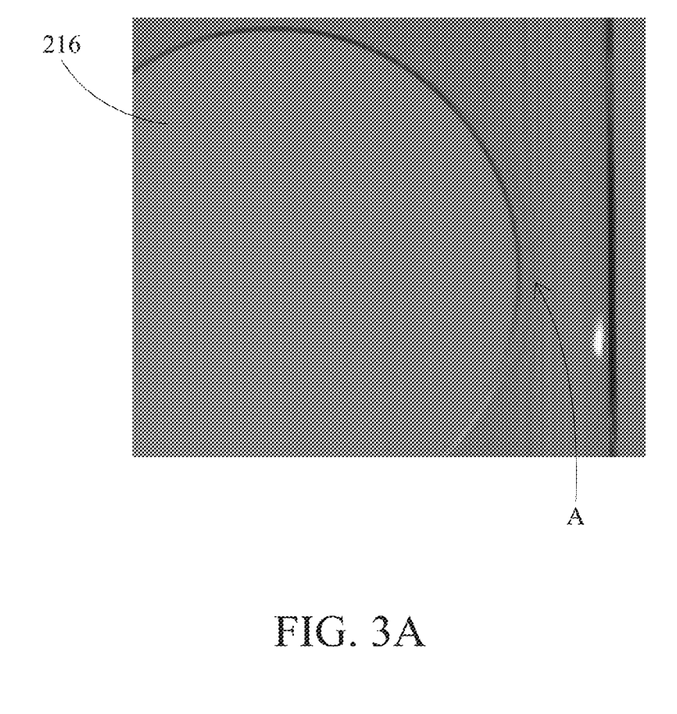
FIG. 3A and FIG. 3B are respectively schematic views of a defective touch panel in which at least one opening on the touch panel enters into edge areas and a schematic view of a qualified touch panel in which the at least one opening on the touch panel does not enter into the edge areas, as detected using the detection method of the present invention.
Figure 3B:
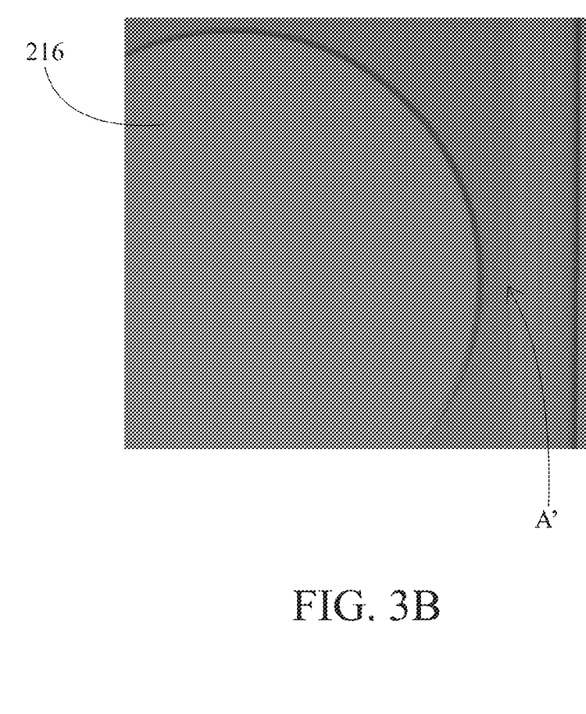

I. "Opening Defect" Detection:

In the present invention, the touch panel 200 has a front surface 210 and a rear surface 220 disposed opposite to the front surface 210. The front surface 210 comprises a central area 212 and four edge areas 214. The four edge areas 214 are disposed around the central area 212. The four edge areas 214 are curved edge areas and the central area 212 has an opening 216 formed therein.

When the touch panel 200 is disposed on the LCD monitor 110, the rear surface 220 thereof is in contact with the LCD monitor 110. The at least one strip light pattern 112 is emitted and displayed by the LCD monitor 110 and sequentially passes through the rear surface 220 and the front surface 210 from bottom to top and is received by the camera 130 disposed above the LCD monitor 110.

Therefore, whether the opening 216 enters into a curved part of the edge areas 214 may be determined by using at least one striped light pattern 112 passing through the interface between the opening 216 and the four edge areas 214.

For example, as shown in FIG. 3A, if the opening 216 enters into the curved part of the edge areas 214 (i.e., the touch panel 200 is determined to be defective), then, the striped light pattern 112 passing through the area will be affected by the edge of the opening 216, and thereby, a first refracted image is generated.

On the contrary, as shown in FIG. 3B, if the opening 216 does not enter into the curved part of the edge areas 214 (i.e., the touch panel 200 is determined to be qualified), then, the striped light pattern 112 passing through the area will not be affected by the edge of the opening 216, and thereby, a striped pattern is still formed.

The aforesaid first refracted image that is used to determine whether the touch panel is defective may be an arc-shaped section or a curved image so that the detecting personnel or the processor can rapidly make relevant determination.

Figure 4A:
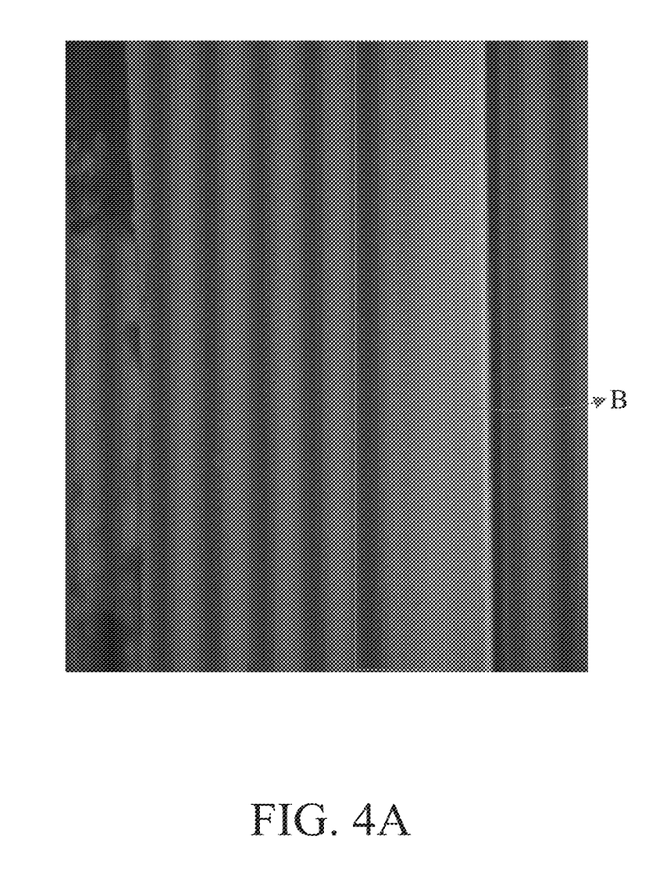
FIG. 4A and FIG. 4B are respectively schematic views of a defective touch panel in which the edge area on the touch panel has an edge area defect and a schematic view of a qualified touch panel in which the edge area on the touch panel does not have the edge area defect, as detected using the detection method of the present invention.
Figure 4B:
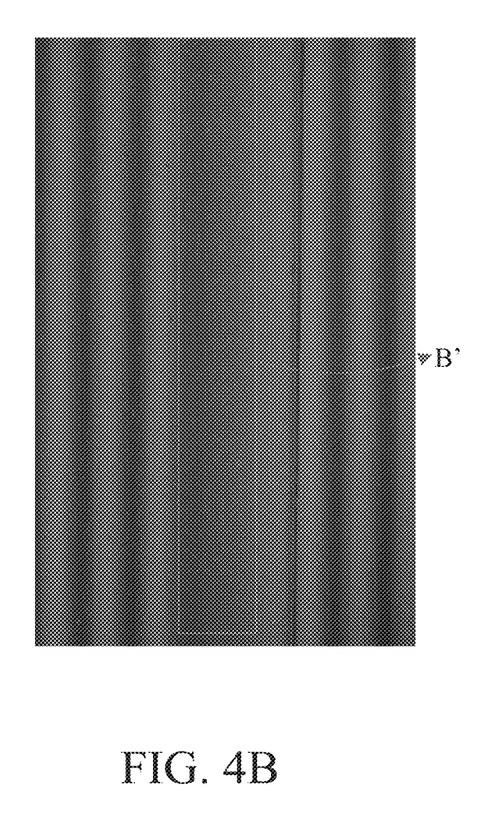

II. "Edge Area Defect" Detection:

The determination of whether an edge area defect (also known as a horizontal line defect) is formed in the four edge areas 214 during the injection molding of the touch panel 200 is done by using the at least one striped light pattern 112 passing through the edge areas.

That is, as shown in FIG. 4A, if there is an edge area defect during the injection molding of the touch panel 200, a second refracted image is generated during the process in which the at least one striped light pattern 112 passes through the four edge areas 214. In this case, the stripe formed by the at least one striped light pattern 112 is changed so that the touch panel 200 is determined by the processor to be defective.

On the contrary, as shown in FIG. 4B, if there is no edge area defect during the injection molding of the touch panel 200 (i.e., the touch panel 200 is determined to be qualified), then the striped light pattern 112 passing through the four edge areas 214 will not be affected by the edge area defect, and thereby a striped pattern is still formed.

Figure 5A:
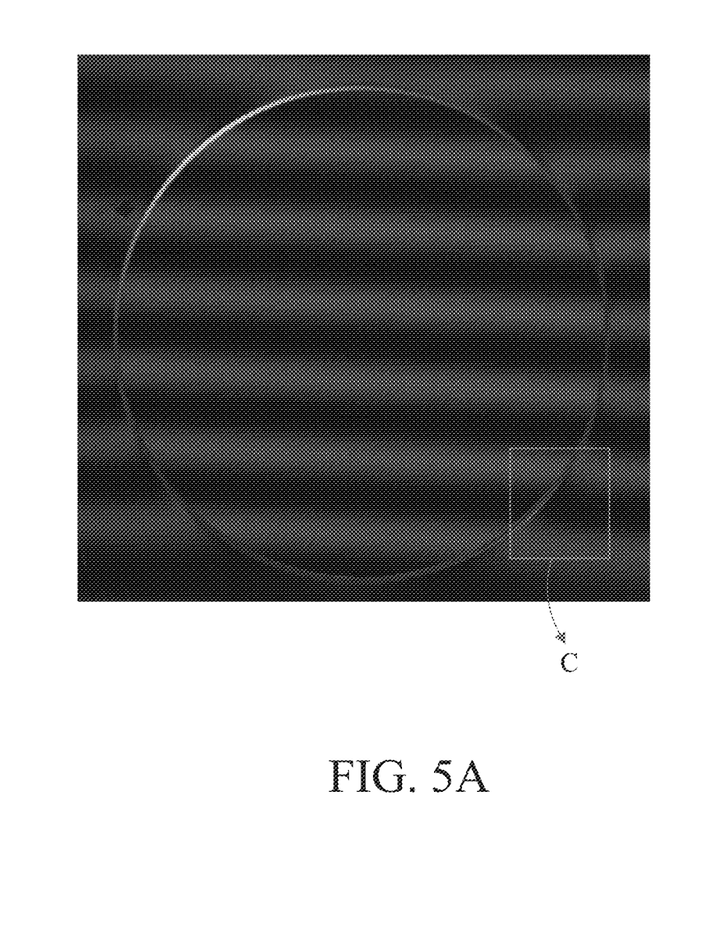
FIG. 5A and FIG. 5B are respectively schematic views of a defective touch panel in which the opening on the touch panel has an opening barrier defect and a schematic view of a qualified touch panel in which the opening on the touch panel does not have the opening barrier defect, as detected using the detection method of the present invention.
Figure 5B:
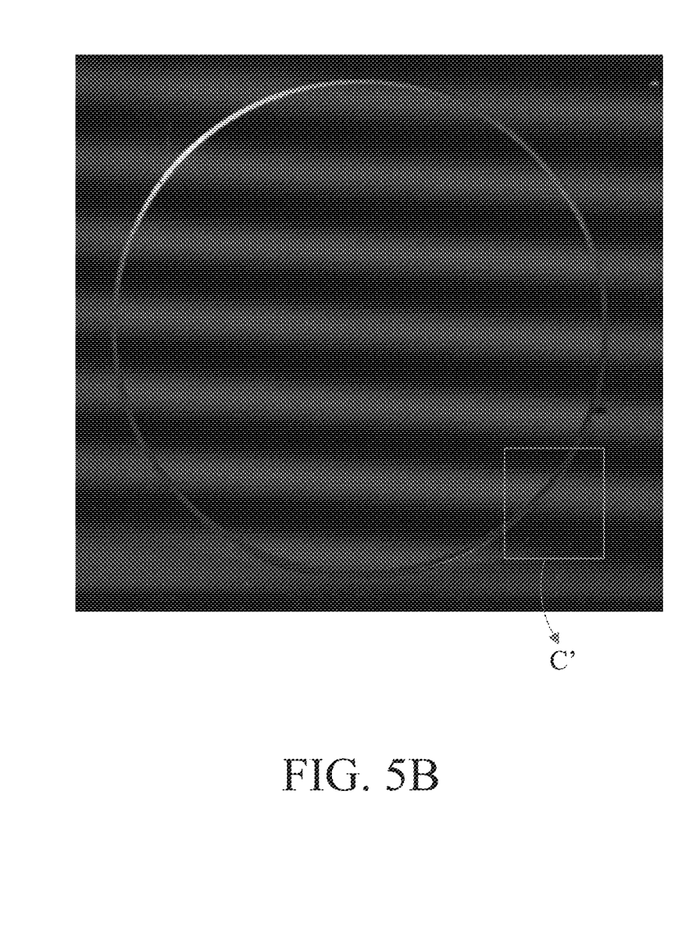

III. "Opening Barrier Defect" Detection:

If the flatness of a plane near the opening 216 of the touch panel 200 is to be detected, then the flatness of the plane around the opening 216 may be defined as "the opening barrier" (also known as the aperture barrier). Similarly, the flatness of the plane is determined by using the at least one striped light pattern 112 passing through the opening barrier.

That is, as shown in FIG. 5A, if there is an opening barrier defect during the injection molding of the touch panel 200, then a third refracted image is generated during the process in which the at least one striped light pattern 112 passes through the opening barrier defect so that the touch panel 200 is determined by the processor to be defective.

On the contrary, as shown in FIG. 5B, if there is no opening barrier defect during the injection molding of the touch panel 200 (i.e., the touch panel 200 is determined to be qualified), then the striped light pattern 112 passing through the plane near the opening 216 will not be affected by the opening barrier defect, and thereby, a striped pattern is still formed.

The aforesaid third refracted image that is used to determine that the touch panel is defective may be practically a striped diffused image so that the detecting personnel or the processor can rapidly make relevant determination.

Figure 6A:
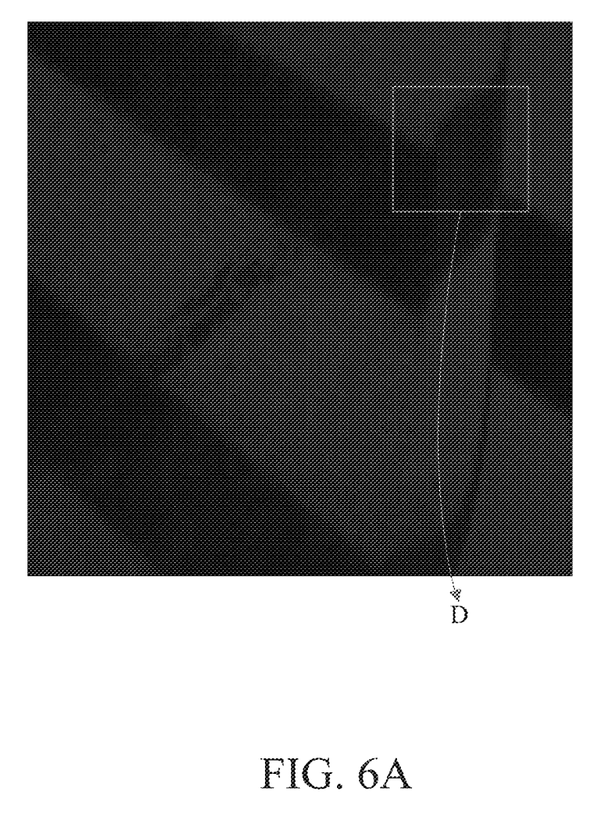
FIG. 6A and FIG. 6B are respectively schematic views of a defective touch panel in which there is an interface defect at an interface between a central area and the edge area and a schematic view of a qualified touch panel in which there is no interface defect at the interface between the central area and the edge area, as detected using the detection method of the present invention.
Figure 6B:
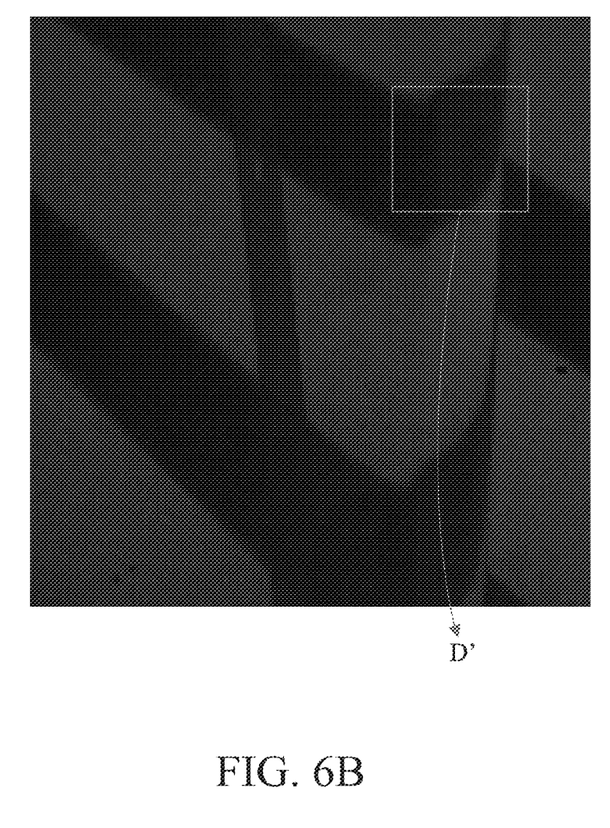

IV. "Defect at the Interface Between the Central Area and the Edge Area" Detection:

Whether an interface defect is formed at the interface between the central area 212 and the edge areas 214 during the injection molding of the touch panel 200 may also be determined by using the at least one striped light pattern 112 passing through the interface between the central area 212 and the edge areas 214.

In detail, as shown in FIG. 6A, if there is an interface defect during the injection molding of the touch panel 200, then a fourth refracted image is generated during the process in which the at least one striped light pattern 112 passes through the interface defect so that the touch panel 200 is determined by the processor to be defective.

On the contrary, as shown in FIG. 6B, if there is no interface defect during the injection molding of the touch panel 200 (i.e., the touch panel 200 is determined to be qualified), then, the striped light pattern 112 passing through the interface between the central area 212 and the edge areas 214 will not be affected, and thereby a striped pattern is still formed.

The aforesaid fourth refracted image that is used to determine whether the touch panel is defective may be a staggered image, so that the detecting personnel or the processor can rapidly make relevant determination.

Thus, in this application, "opening defect," "edge area defect," "opening barrier defect," and "defect at the interface between the central area and the edge area" or the like may be detected for the touch panel 200 with the curved edge areas simply by emitting and displaying a single striped light pattern 112 or a plurality of striped light patterns 112 from the LCD monitor 110, thereby shortening the detection time and further improving the detection efficiency.

It shall be particularly appreciated that, the aforesaid at least one striped light pattern 112 may have a plurality of parallel stripes for detecting two short sides or two long sides of the touch panel 200 respectively.

Furthermore, in a preferred embodiment, the aforesaid touch panel 200 is an injection molded touch panel.

According to the above descriptions, with the arrangement relationships between the LCD monitor 110, the transfer device 120, the camera 130 and the processor 140 comprised in the detection device 100 of the present invention and the relevant detection method, "opening defect", "edge area defect", "opening barrier defect", and "defect at the interface between the central area and the edge area" or the like may be detected for the touch panel 200 that is disposed above the LCD monitor 110 simply by emitting and displaying at least one striped light patterns 112 from the LCD monitor 110 during the detection of the touch panel 200. This achieves the objective of rapidly detecting the touch panel 200, and avoids the drawbacks of detection performed through visual inspection in the prior art.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A detection method for a touch panel, comprising the following steps of:
    using a transfer device to move the touch panel;
    placing the touch panel on an LCD monitor;
    emitting at least one striped light pattern from the LCD monitor;
    using at least one camera to capture an image formed by the at least one striped light pattern through the touch panel; and
    using a processor to analyze the image to complete the detection of the touch panel, wherein the touch panel has a front surface and a rear surface disposed opposite to the front surface, the front surface comprises a central area and four edge areas disposed around the central area, the four edge areas are curved edge areas and the central area has at least one opening formed therein.

2. The detection method of claim 1, wherein if a part of the at least one opening is formed in at least one of the four edge areas, a first refracted image is formed by the at least one striped light pattern passing through the part of the at least one opening so that the touch panel is determined by the processor to be defective.

3. The detection method of claim 1, wherein if there is a horizontal line in the four edge areas, a second refracted image is formed by the at least one striped light pattern passing through the horizontal line so that the touch panel is determined by the processor to be defective.

4. The detection method of claim 1, wherein if the at least one opening has an opening barrier defect, a third refracted image is formed by the at least one striped light pattern passing through the opening barrier defect so that the touch panel is determined by the processor to be defective.

5. The detection method of claim 1, wherein if there is an interface defect at an interface between the central area and the four edge areas, a fourth refracted image is formed by the at least one striped light pattern passing through the interface defect so that the touch panel is determined by the processor to be defective.

6. The detection method of claim 1, wherein the at least one striped light pattern has a plurality of parallel stripes for detecting two short sides of the touch panel.

7. The detection method of claim 1, wherein the at least one striped light pattern has a plurality of parallel stripes for detecting two long sides of the touch panel.

8. The detection method of claim 1, wherein the touch panel is an injection molded touch panel.

9. A detection device for detecting the touch panel of claim 1, the detection device comprising:
    an LCD monitor, being adapted to emit at least one striped light pattern;
    a transfer device, being adapted to grab the touch panel and place the touch panel on the LCD monitor;
    at least one camera disposed above the LCD monitor; and
    a processor electrically connected with the at least one camera;
    wherein the at least one camera is adapted to capture an image formed by the at least one striped light pattern through the touch panel, and the processor analyzes the image to complete the detection of the touch panel.

10. The detection device of claim 9, wherein the at least one striped light pattern has a plurality of parallel stripes for detecting two short sides of the touch panel.

11. The detection device of claim 9, wherein the at least one striped light pattern has a plurality of parallel stripes for detecting two long sides of the touch panel.

12. The detection device of claim 9, wherein the touch panel is an injection molded touch panel.

* * * * *